3,324,091
ANTISTATIC COMPOSITION

Christos Savides, Piscataway Township, Middlesex County, N.J., assignor to American Cyanamid Company, Stamford, Conn., a corporation of Maine
No Drawing. Filed Mar. 31, 1964, Ser. No. 356,032
3 Claims. (Cl. 260—80.7)

This invention relates to the provision of thermoplastic compositions having desirable antistatic properties. More particularly, it relates to the prevention or minimization of accumulated surface electrostatic charges on thermoplastics through the use of a two-component antistatic agent consisting of a quaternary compound of the Formula I:

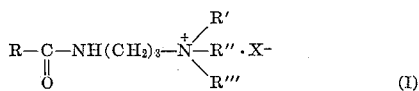

and a phosphine of the group consisting of triphenyl phosphine (TPP) and tetra-(2-cyanoethyl)-ethylene diphosphine (TCED). In Formula I, R is alkyl of 7–18 carbons, R' and R" are lower alkyl and R''' is either lower alkyl or hydroxyethyl. "X" represents an anion such as nitrate, halide, perchlorate, hydrogen phosphate, phosphate, hydrogen sulfate, alkyl sulfate, borate, hydrogen carbonate, carbonate, acetate or other common inorganic and organic anion. Additionally, this invention includes the composition resulting from this method.

An antistatic agent for internal use in (as opposed to external coating on) thermoplastics, must fulfill certain special requirements beginning with sufficient activity to give adequate antistatic effect at practical concentration levels. The agent must also be of a nature such that it can be quickly and uniformly incorporated into the composition during the compounding step, and, desirably, it should not impart color to the substrate. Various antistatic compounds have been proposed for use. However, antistatic agents which are effective when applied by normal coating methods, are not satisfactory for internal use, since during processing under necessarily high temperatures, they decompose and may cause decomposition of the plastic (perhaps catalyzed by the antistatic agent), resulting in undesirable darkening, or even complete discoloration of the polymeric product. In this condition, the latter is unsatisfactory for normal usage. An antistatic agent having this effect is, of course, not of interest.

It is an object of the present invention to provide an antistatic agent, which agent reduces accumulation of electrostatic charges, but does not interfere with the heat stability of the substrate during high-temperature milling and molding operations necessary for converting the latter to shaped articles.

The present invention is based on the discovery that the two-component antistatic agent of this invention has excellent antistatic activity even after exposure to high temperatures. It produces little, if any, decomposition or discoloration of the substrate.

The components of the antistatic agent may be added to the thermoplastic in several ways. The order of addition of the phosphine to the quaternary compound is not important. A preformed mixture can be made by contacting the quaternary salt in a polar solvent, with at least one equimolecular amount of a tertiary phosphine. This can be incorporated into a thermoplastic molding composition or applied to the surface of a thermoplastic to produce an article which remains free of static charge, when handled conventionally. This method is convenient because the quaternary ammonium salt is usually commercially available in the form of 25–50 percent solutions of the salt in a polar solvent such as equal parts of isopropanol and water. The phosphine may be added directly to this polar solution and the resultant mixture or composition can be incorporated in the thermoplastic or used for surface treatment. Or, the polar solvent may be removed and the residue used in a thermoplastic.

The amount of phosphine used should be at least one molecular equivalent of the antistatic quaternary ammonium salt. A slight excess is ordinarily used. A larger excess of phosphine, while operable in the practice of this invention, is unnecessary.

To incorporate a heat stabilized antistatic composition of this invention in a thermoplastic, 0.5 to 3.0 percent by weight of the composition may be added to the thermoplastic prior to injection molding or shaping. Or, the antistatic agent may be applied to the shaped thermoplastic by spraying, dipping, brushing or wiping with a 10–30 weight percent solution of the agent. Treatment of the thermoplastic by any of these methods, gives a thermoplastic composition which is free of and does not accumulate electric charge.

The heat-stabilized antistatics of this invention are useful for the treatment of thermoplastics such as styrene, acrylics, cellulosics, polyolefins, nylons, vinyls, acetals, chlorinated polyethers, some polyurethanes and fluorocarbons and mixtures of these homoplastics. They are particularly useful for avoiding static charges in fibers, sheets and films of polyethylene, polypropylene, polyvinyl chloride and nylon.

The invention is illustrated by the following examples in which parts and percentages are on a weight basis.

Example 1

One gram of triphenyl phosphine is added to 20 ml. of a 50 percent solution of stearamidopropyldimethyl-$\beta$-hydroxyethyl ammonium nitrate (SAN) in equal amounts of water and isopropyl alcohol. The solvent is evaporated. The residue is aged in a forced draft air oven at 175° C. The degree of stabilization to heat is measured in terms of the time (in minutes) it takes for the residue to discolor at 175° C. The residue does not discolor for 80 minutes. A similar solution without the phosphine discolors in only ten minutes.

Example 2

When the phosphine of Example 1 is replaced with an equal weight of tetra-(2-cyanoethyl)-ethylene diphosphine, the resulting antistatic agent withstands the aging test in Example 1 for forty minutes before discoloration starts.

Example 3

To a steam heated, two-roll lab mill at 165° C. is added 100 grams of high density polyethylene. Upon softening, 3.0 g. of a 50 percent solution of stearamidopropyldimethyl-$\beta$-hydroxyethyl ammonium nitrate containing equal parts water and isopropyl alcohol and 1.5 grams of triphenyl phosphine are added. The mix is blended and cut 45 times in the mill. It is then removed and molded at 165° C. to a 50-mil 2½ x 2" square plate.

Similarly, a 100-gram portion of high density polyethylene alone, and a 100-gram portion to which 3.0 grams of a 50 percent solution of the above quaternary ammonium salt without the phosphine, is run through the above milling procedure and molded similarly.

The three plates are then compared for degree of yellowing in a differential colorimeter. Results are expressed as a Yellow Index and given in Table I. The antistatic properties of the thermoplastic compositions are measured by a Terra-Ohm meter which measures electric resistance across the surface of the plate at constant voltage.

TABLE I

| No. | Thermoplastic Composition | Yellow Index | Resistivity in Megohms |
|---|---|---|---|
| A | Polyethylene and 1.5 percent phosphine and 1.5 percent quaternary salt. | 4 | $2 \times 10^3$ |
| B | Polyethylene and 1.5 percent quaternary ammonium salt. | 10 | $8 \times 10^4$ |
| C | Polyethylene | 2 | $10 \times 10^7$ |

Example 4

If, in Example 3, high density polyethylene is replaced with an equal amount of a thermoplastic polymer "ABS," made by copolymerizing acrylonitrile with butadiene and styrene, and milled and molded at 175° C. instead of 165° C., results comparable to Example 3 are obtained. The addition of triphenyl phosphine is found to substantially reduce the discoloration without affecting the antistatic property.

TABLE II

| Thermoplastic Composition | Yellow Index | Observed Color |
|---|---|---|
| ABS | 31 | Light yellow. |
| ABS and 1.5 percent quaternary ammonium salt. | 39 | Dark brown. |
| ABS and 1.5 percent quaternary ammonium salt and 1.5 percent triphenyl phosphine. | 32 | Light yellow. |

Example 5

If, in Example 3, instead of 3.0 grams of a 50 percent solution of the nitrate salt, 4.6 grams of a 35 percent solution of the dihydrogen phosphate salt is used, a similar result is obtained.

I claim:

1. A composition capable of imparting antistatic properties to thermoplastics, which comprises a quaternary compound of the formula:

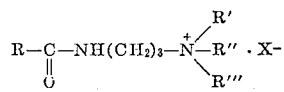

wherein R is alkyl of 7–18 carbons, R' and R" are each lower alkyl, R''' is a member selected from the group consisting of lower alkyl and hydroxyethyl, and X is an anion; and at least a molar amount of a phosphine selected from the group consisting of triphenyl phosphine and tetra-(2-cyanoethyl)-ethylene diphosphine.

2. An antistatic agent consisting essentially of stearamido propyldimethyl-β-hydroxyethyl ammonium nitrate and a equimolar amount of triphenyl phosphine.

3. A polymeric composition having resistance to the accumulation of surface charge, which comprises a thermoplastic and 0.5 to 3.0 percent, based on the weight of the thermoplastic, of an antistatic agent consisting essentially of a quaternary compound of the formula:

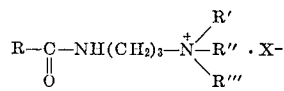

wherein R is alkyl of 7–18 carbons, R' and R" are each lower alkyl, R''' is a member selected from the group consisting of lower alkyl and hydroxyethyl, and X is an anion; and at least a molar amount of a phosphine selected from the group consisting of triphenyl phosphine and tetra-(2-cyanoethyl)-ethylene diphosphine.

References Cited

UNITED STATES PATENTS 2,626,876   1/1953   Carnes _____ 117—138.8

JOSEPH L. SCHOFER, *Primary Examiner.*

LAWRENCE EDELMAN, *Assistant Examiner.*